United States Patent Office 3,135,378
Patented June 2, 1964

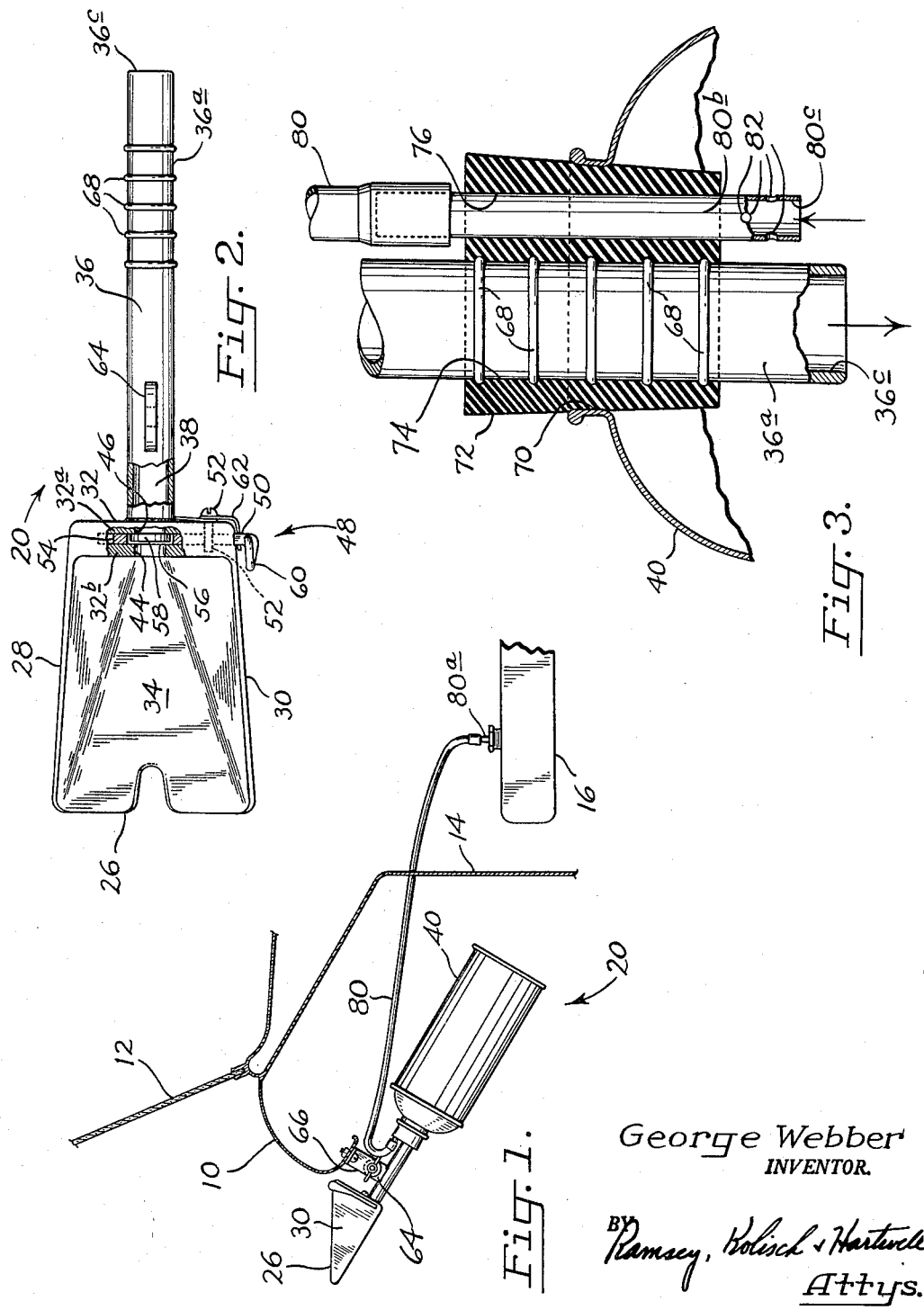

3,135,378
VACUUM-OPERATED DISPOSAL DEVICE
George Webber, 2236 NE. Prescott, Portland, Oreg., assignor of thirty-three and one-third percent to Murray Kemp and thirty-three and one-third percent to Alfred S. Parkhurst, both of Portland, Oreg.
Filed Feb. 2, 1962, Ser. No. 170,756
4 Claims. (Cl. 206—19.5)

This invention generally relates to devices for disposing of ashes and related materials, such as cigarette stubs, matches, etc. discarded during and after smoking, such material being referred to herein as "smoking debris." More particularly, this invention concerns devices of such a description that are vacuum operated, and that include a receptacle for collecting smoking debris, with such material traveling into the receptacle from an ash tray, with the latter evacuatable by subatmospheric or vacuum pressure.

Such vacuum-operated disposal devices are particularly suited for installation in the driving compartment of an automobile and other vehicles, where a vacuum source is available (as by connecting the device to the manifold of the automobile engine), and where speedy and complete removal of smoking debris is desirable both for reasons of safety as well as neatness. As disclosed herein, the vacuum-operated disposal device takes the form of an accessory that may be installed under the dash panel of an automobile driving compartment.

In such disposal devices, it is important that a suitable vacuum be maintained at all times within the receptacle collecting the debris (since it is this vacuum that causes material to be drawn from the ash tray into the receptacle). If this vacuum is to be maintained, it is desirable that the conduit or pipe connecting the receptacle with the vacuum source have an intake end always fully opened to the interior of the collecting receptacle. Unfortunately, this has not always been the case, by reason of the fact that ashes, matches, stubs, etc., especially upon disintegration and their reaching the receptacle, are thrown about within the receptacle and eventually clog the vacuum conduit intake. For practical reasons, it is not only desirable that the connection of the vacuum conduit with the container be substantially clog-free, but further, it is advantageous that the construction selected be simple (so as to be trouble-free in operation) and leave the receptacle readily removable to enable the dumping of ashes therefrom.

Generally, it is an object of this invention to provide an improved vacuum-operated disposal device, constructed so as to be relatively free of clogging tendencies. While the construction produces the result desired, at the same time it is extremely simple and trouble-free.

Another object is to provide such a disposal device, that includes an easily disconnected receptacle or container for collecting smoking debris.

A still further object of the invention is to provide an improved vacuum-operated disposal device, including a receptacle for collecting smoking debris, that is easily installed in a vehicle and placed in operating condition.

These and other objects and advantages are attained by the invention, and the same is described hereinbelow in conjunction with the accompanying drawings, wherein:

FIG. 1 illustrates the device installed in portions of the driving compartment of an automobile;

FIG. 2 is an enlarged view of the ash tray portion of the device including an evacuating conduit connected thereto; and FIG. 3 is a view, on an even larger scale, showing how various conduits in the construction may be mounted with ends communicating with the inside of a collecting receptacle.

Referring now to the drawings, and first of all more particularly to FIG. 1, illustrated in the figure are portions of an automobile, including a dashboard 10, windshield 12, and a fire wall 14, the latter being provided to divide the passenger compartment of the automobile from the engine compartment disposed forwardly thereof. Portions of an engine manifold are indicated at 16. The manifold constitutes a vacuum source or a subatmospheric pressure source. The vacuum-operated disposal device of the invention is indicated generally at 20. The device is mounted beneath dashboard 10, and includes a suitable connection with manifold 16, as will hereinafter be described.

Considering now in more particular the construction of the disposal device, and referring now to FIGS. 1, 2, and 3, at 26 there is indicated an ash tray portion, mounted so as to be within reach of the passengers in the vehicle. The ash tray portion includes oppositely disposed side walls 28, 30, a back wall 32, and a base 34. The walls are joined together, and define a hollow space for receiving debris.

Base 34 has a tapered outline, as can be seen in FIG. 2, and side walls 28, 30 converge on each other along the base, progressing toward back wall 32. In operative position the base is inclined, as shown in FIG. 1. Thus, debris deposited in the ash tray portion tends to be funneled by the side walls and base into a zone located adjacent the bottom margin and midway between the side margins of back wall 32.

Joined to ash tray portion 26 is a delivery conduit 36. The delivery conduit has a passage 38 extending along the inside thereof. In operation of the device, material travels from the ash tray portion through passage 38 to a receptacle 40 connected to one end of conduit 36 and provided to collect debris.

Back wall 32 comprises front and rear sections 32a, 32b spaced apart from each other. At 44 and 46 are indicated axially aligned bores, in front and rear sections 32a, 32b. The bores also are in axial alignment with passage 38. A valve mechanism 48 is provided that normally operates to close off bore 44 from bore 46, and produce a fluid-tight seal over bore 46. The valve mechanism is adjustable to a position where the two bores are open to each other, and a continuous passage is provided from the inside of the ash tray portion to passage 38.

More specifically, and considering valve mechanism 48, 50 indicates a blade member pivoted at 52 to the ash tray portion, with a flat end 54 integral therewith disposed within the space between wall sections 32a, 32b. End 54 is provided with a bore 56 within which is seated a floating disc 58, of larger diameter than bores 44 and 46. The blade member has a handle portion 60, which may be depressed to pivot end 54 upwardly, thus to move disc 58 and end 54 away up and from bores 44, 46. In the position shown (or the lowered position for the blade member), disc 58 completely covers bore 46, and with a subatmospheric pressure within passage 38, the disc is held tightly against the margins of the bore to produce a fluid-tight seal. At 62 is indicated a spring which is attached to the blade member, and operates to urge it to its closed position.

Conduit 36 in the embodiment illustrated comprises a short length of pipe having joined thereto an ear 64 used in mounting the device in place. The device is secured to a bracket 66, with the latter fastened to the underside of dashboard 10. The end of the delivery conduit away from ash tray portion 26 is provided with a series of annular ridges 68, used in the connection of the conduit with receptacle 40.

As already indicated, a feature of the invention is that receptacle 40 is easily detached to enable it to be cleared of debris. Further, the vacuum conduit is connected to the receptacle in such a manner as to be substantially free of clogging tendencies. These features of the invention will now be more fully described.

Receptacle 40 may take the form of a jar with an opening 70 at the top thereof. The delivery conduit extends into the jar through a detachable plug or stopper member 72 (made, for instance, of cork of rubber), tightly wedged within opening 70.

Stopper member 72 has a pair of parallel bores 74, 76 extending therethrough. Bore 74, the larger bore, extends axially through the center of the stopper member and receives an end portion 36a of conduit 36. As shown, end portion 36a protrudes a small distance beyond the base of the stopper member. Ridges 68 produce a tight mounting for conduit 36 within the stopper member.

At 80 is indicated a tube or conduit that is connected at end 80a with the usual manifold of the automobile engine. The other end 80b of the tube extends into jar 40 through the smaller bore 76 provided in stopper member 72. End 80b also protrudes beyond the base of the plug or stopper member, preferably, however, not as much as end 36a.

Conduit 36 and tube 80 have openings (indicated at 36c and 80c) at the extremeties thereof whereby the conduits communicate with the interior of container or jar 40. Since the end portions extend through parallel bores (and are parallel to each other) the conduit and tube provide susbtantially parallel air flow passages where they communicate with the container. When a rush of air is produced by opening valve mechanism 48, the flow of air into the container downwardly through conduit 36 and the flow of air out of the container upwardly through the intake end of tube 80 are parallel and in opposite directions. The flow patterns are indicated by the arrows in FIG. 3. This counterflow adjacent the top of the receptacle, and the fact that the discharge of conduit 36 is below the intake through tube 80, are important factors in minimizing clogging tendencies.

As can be seen with reference again to FIG. 3, tube 80, in addition to being provided with an end opening 80c, has a series of small bleed bores or apertures 82 extending through the side wall thereof and placed inwardly on the tube somewhat from end opening 80c. These apertures or bores are circumferentially spaced about the tube. The bores perform the important function of reducing the flow of air into the tube through the end opening, and also providing alternate passages for air into the tube that communicate with the interior of jar 40 through the sides of the tube.

Explaining now the operation of the device, and assuming that the valve mechanism is temporarily opened and that the motor is running (so that a vacuum is established in the manifold), with a cigarette butt or other debris in the ash tray portion, it is carried by the flow of air resulting down conduit 36 into container 40. The debris on entering jar 40 is ejected in an axial direction, while traveling at a relatively fast rate, and downwardly toward the base of jar 40. Air withdrawn from the container or jar flows into the intake end of tube 80, with such air flow, as already mentioned, paralleling the flow of air out of conduit 36.

In the event that a large piece of material should become entrained in the air and find itself being carried upwardly to be expelled through tube 80, it is unlikely that such will clog the intake end of tube 80. This is because it is almost impossible to close all air flow passages into tube 80 simultaneously, and with only part of the passages closed by a piece of material, suction acting on the material is not sufficient to hold the material in place. In the unlikely circumstance that a piece of material should permanently clog an escape passage, others of course remain open.

When it is desired to dump the container, it is a simple manner to remove the jar and empty it. Such is done by pulling the jar from the stopper. The mounting of the conduit and tube in the stopper need not be disturbed.

Note that the device is supported through the connection of conduit 36 with bracket 66. The stopper wedged within the top of the jar is sufficient to support the jar. Preferably the jar is not held in a vertical position, but on an incline. Thus, the full weight of the jar is not acting to pull the jar loose.

I claim:

1. A vacuum-operated device for disposing of smoking debris comprising, in operative air-circulating position, an ash tray portion, a receptacle for collecting the debris, delivery conduit means extending between said ash tray portion and said receptacle including an end portion extending into said receptacle, said end portion having an opening at the extremity thereof communicating with the interior of said receptacle adjacent the top of the latter, vacuum conduit means adapted to be connected to a vacuum source including an end portion extending into said receptacle substantially paralleling the end portion of said delivery conduit means, said end portion of the vacuum conduit means having an opening at the extremity thereof communicating with the interior of said receptacle adjacent the top of the latter, said openings at the extremities of said end portions providing substantially parallel air flow passages where they communicate with the interior of the container whereby flows of air into the vacuum conduit means and out of the delivery conduit means are in opposite directions, and bleed means connecting the interior of said container and said vacuum conduit means placed inwardly from the opening at the extremity of the end portion.

2. A vacuum-operated device for disposing of smoking debris comprising, in operative air-circulating position, an ash tray portion, a receptacle for collecting the debris, a delivery conduit connected at one end to and extending from said ash tray portion, a vacuum conduit adapted to be connected at one end to a vacuum source, said delivery and vacuum conduits having end portions opposite their said one ends disposed substantially parallel to each other and extending into said receptacle adjacent the top thereof, openings in the extremeties of said end portions whereby the conduits communicate with the interior of said receptacle, and plural bleed apertures in the wall of said vacuum conduit connecting the latter with the interior of said container and located inwardly from the opening in the extremity of the vacuum conduit and distributed circumferentially about the wall of the vacuum conduit.

3. A vacuum-operated device for disposing of smoking debris comprising, in operative air-circulating position, a receptacle for collecting the debris, conduit means with a discharge end connecting with the interior of the receptacle for delivering the debris thereto, means for evacuating the receptacle of air comprising a vacuum conduit with an end portion extending into said receptacle adjacent the top thereof, said end portion terminating at a point above said discharge end of said conduit means, said vacuum conduit having an opening in the extremity thereof connecting the conduit with the interior of said receptacle, and plural apertures in and the wall of said vacuum conduit placed inwardly on the vacuum conduit from the opening in the extremity thereof, said apertures being distributed circumferentially about the vacuum conduit and providing radially extending passages connecting the interior of the container and said vacuum conduit.

4. A vacuum-operated device for disposing of smoking debris comprising, in operative air-circulating position, an ash tray portion, a receptacle for collecting the debris, a delivery conduit extending between said ash tray portion and said receptacle including an end portion extending into said receptacle, said end portion having an opening at the extremity thereof communicating with the interior of the receptacle adjacent the top of the latter, a vacuum conduit adapted to be connected to a vacuum source including an end portion extending into said receptacle substantially paralleling the end portion of said delivery conduit, said end portion of the vacuum conduit having an opening at the extremity thereof communicating with the interior of the receptacle adjacent the top of the latter, said openings in said end portions providing upright substantially parallel air flow passages within said container, the opening for the end portion of said vacuum conduit being spaced above the opening for the end portion of said delivery conduit, and bleed means connecting the interior of the container and the vacuum conduit disposed inwardly from the opening at the extremity of its end portion, said bleed means accommodating minor air flow in relation to the air flow accommodated through the opening at the extremity of the vacuum conduit's end portion.

References Cited in the file of this patent

UNITED STATES PATENTS

| | | |
|---|---|---|
| 1,358,089 | Maisel | Nov. 9, 1920 |
| 2,075,405 | Paul | Mar. 20, 1937 |
| 2,874,702 | Walker | Feb. 24, 1959 |
| 2,891,662 | Frost | June 23, 1959 |

FOREIGN PATENTS

| | | |
|---|---|---|
| 76,056 | Germany | Nov. 15, 1917 |